United States Patent
Yamamoto et al.

(10) Patent No.: US 12,116,510 B2
(45) Date of Patent: Oct. 15, 2024

(54) HOT MELT ADHESIVE COMPOSITION, ADHESIVE TAPE, AND METHOD FOR PRODUCING ADHESIVE TAPE

(71) Applicant: DENKA COMPANY LIMITED, Tokyo (JP)

(72) Inventors: Yoshiaki Yamamoto, Tokyo (JP); Akiyoshi Kimura, Tokyo (JP); Yosuke Tate, Tokyo (JP); Toshikatsu Mitsunaga, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 249 days.

(21) Appl. No.: 17/637,268

(22) PCT Filed: Sep. 24, 2020

(86) PCT No.: PCT/JP2020/035980
§ 371 (c)(1),
(2) Date: Feb. 22, 2022

(87) PCT Pub. No.: WO2021/065662
PCT Pub. Date: Apr. 8, 2021

(65) Prior Publication Data
US 2022/0306904 A1    Sep. 29, 2022

(30) Foreign Application Priority Data

Oct. 1, 2019 (JP) ................. 2019-181606

(51) Int. Cl.
| | | |
|---|---|---|
| C09J 125/10 | (2006.01) | |
| C09J 5/06 | (2006.01) | |
| C09J 7/35 | (2018.01) | |
| C09J 11/06 | (2006.01) | |
| C09J 11/08 | (2006.01) | |

(52) U.S. Cl.
CPC . C09J 7/35 (2018.01); C09J 5/06 (2013.01); C09J 11/08 (2013.01); C09J 125/10 (2013.01); *C09J 2301/16* (2020.08); *C09J 2301/304* (2020.08); *C09J 2301/408* (2020.08)

(58) Field of Classification Search
CPC ............ C09J 125/10; C09J 11/06; C09J 11/08
See application file for complete search history.

(56) References Cited

U.S. PATENT DOCUMENTS

| | | | | |
|---|---|---|---|---|
| 4,695,493 A | * | 9/1987 | Friedlander | B32B 7/06 428/95 |
| 2009/0298995 A1 | | 12/2009 | Krawinkel | |
| 2011/0086563 A1 | | 4/2011 | Lange et al. | |
| 2017/0022399 A1 | | 1/2017 | Isobe et al. | |
| 2017/0101499 A1 | | 4/2017 | Nakatani et al. | |

FOREIGN PATENT DOCUMENTS

| | | | | |
|---|---|---|---|---|
| CN | 102057005 A | | 5/2011 | |
| CN | 110205065 A | | 9/2019 | |
| JP | H05-98228 A | | 4/1993 | |
| JP | 2015-187188 A | | 10/2015 | |
| JP | 2015-203032 A | | 11/2015 | |
| JP | 2018-003035 A | | 1/2018 | |
| JP | 2018141045 A | * | 9/2018 | |
| WO | 03/018702 A1 | | 3/2003 | |
| WO | 2015/178260 A1 | | 11/2015 | |
| WO | 2015200641 A1 | | 12/2015 | |
| WO | WO 2018/074070 | * | 4/2018 | ............ C09J 201/00 |

OTHER PUBLICATIONS

Sep. 28, 2022 Extended European Search Report issued in European Patent Application No. 20872041.7.
Jan. 5, 2023 Office Action issued in Chinese Patent Application No. 202080069104.1.
Dec. 1, 2020 Search Report issued in International Patent Application No. PCT/JP2020/035980.

* cited by examiner

Primary Examiner — Caixia Lu
(74) Attorney, Agent, or Firm — Oliff PLC

(57) ABSTRACT

A hot melt adhesive composition which can realize moderate adhesive strength with respect to the adherend when porous substrate is used, the composition, including: a styrene-based block copolymer; a tackifier; and a plasticizer; wherein: the styrene-based block copolymer is a styrene-butadiene block copolymer and a butadiene portion thereof is partially hydrogenated; the tackifier is contained by 65 to 190 parts by mass with respect to 100 parts by mass of the styrene-based block copolymer; and the plasticizer is contained by 0.1 to 24 parts by mass with respect to 100 parts by mass of the styrene-based block copolymer.

6 Claims, No Drawings

HOT MELT ADHESIVE COMPOSITION, ADHESIVE TAPE, AND METHOD FOR PRODUCING ADHESIVE TAPE

TECHNICAL FIELD

The present invention relates to a hot melt adhesive composition, an adhesive tape, and to a method for producing adhesive tape.

BACKGROUND

An adhesive tape obtained by applying an adhesive comprising a styrene-based block copolymer, a tackifier, and the like onto a substrate is used in various applications.

Further, since nonwoven fabric as a substrate is a porous material, it has a sound-damping property, and further has superior mechanical strength such as tensile strength and is low in cost. Therefore, nonwoven fabric is widely used as a tape substrate.

CITATION LIST

Patent Literature

Patent Literature 1: JP 2015-203032 A

SUMMARY OF THE INVENTION

Problems to be Solved by the Invention

On the other hand, since the nonwoven fabric is porous, the applied liquid can seep towards the backside of the substrate. Therefore, it has been considered that since viscosity of solvent-based adhesive and water-based adhesive are too low, it is difficult to directly apply these adhesives onto the substrate. Accordingly, a method in which a hot melt adhesive having relatively high viscosity is used and applied directly onto the substrate has been considered.

When the hot melt adhesive is applied onto porous substrate having large roughness such as nonwoven fabric, the adhesive would not seep towards the backside of the substrate. However, the surface coated with adhesive would become rough, and the contact area of the adhesive with respect to the adherend would become small, thereby giving rise to a problem such as insufficient adhesive strength and holding strength.

In order to solve the afore-mentioned problem, for example, the thickness of the adhesive can be increased. However, such solution requires to apply more than twice amount of the adhesive to achieve the desired adhesive property, and thus it is not efficient. Further, the weight of the tape itself would become heavy, and handling would become difficult. In order to solve such problem, the adhesive itself need be made to have strong adhesion and high holding strength so that the desired adhesive property can be obtained even if the contact area of the adhesive is small.

The stronger the adhesive strength, the more strongly it adheres with the adherend. However, when the adhesive strength is too strong, it becomes difficult to unroll the substrate when it is rolled into a tape.

To decrease the unwinding force, a release agent can be applied to the back surface of the substrate. However, in order to apply a release agent onto a porous substrate such as nonwoven fabric, it is necessary to apply a release agent solution in which the release agent is dissolved in an organic solvent such as toluene. Since the viscosity of such solution is low, there is a problem that the solution would seep towards the backside of the substrate, as seen in the case where the adhesive was applied.

Accordingly, an adhesive which can realize moderate adhesive strength and holding strength and adheres well to the adherend, without the usage of a release agent, is desired.

The present invention has been made by taking the above circumstances into consideration. An object of the present invention is to provide a hot melt adhesive composition which can realize moderate adhesive strength and holding strength with respect to the adherend when porous substrate is used.

Means to Solve the Problem

According to the present invention, a hot melt adhesive composition, comprising: a styrene-based block copolymer; a tackifier; and a plasticizer; wherein: the styrene-based block copolymer is a styrene-butadiene block copolymer and a butadiene portion thereof is partially hydrogenated; the tackifier is contained by 65 to 190 parts by mass with respect to 100 parts by mass of the styrene-based block copolymer; and the plasticizer is contained by 0.1 to 24 parts by mass with respect to 100 parts by mass of the styrene-based block copolymer, is provided.

Hereinafter, various embodiments of the present invention are exemplified. The embodiments described hereinafter can be combined with each other.

Preferably, the tackifier is a petroleum resin.

Preferably, the petroleum resin is at least one selected from the group consisting of C5 petroleum resin, C5C9 petroleum resin, and hydrogenated C9 petroleum resin.

Preferably, the plasticizer is DINA (diisononyl adipate).

According to another aspect, an adhesive tape, comprising: a porous substrate; and an adhesive layer provided on the porous substrate; wherein: the adhesive layer comprises the afore-mentioned hot melt adhesive composition, is provided.

Preferably, the adhesive tape has an adhesive strength according to JIS 20237 "10. adhesive strength" of 1.5 N/cm or more; and the adhesive tape has a holding strength according to JIS 20237 "13. holding strength" of 10 min or more.

According to another aspect, a method for manufacturing the afore-mentioned adhesive tape, comprising the step of: an applying step to apply the hot melt adhesive composition on the substrate by a non-contact application method, is provided.

MODE FOR CARRYING OUT THE INVENTION

Hereinafter, various embodiments of the present invention will be described. Various distinctive features shown in the following embodiments can be combined with each other. In addition, an invention can be established independently for each of the distinctive features.

1. Hot Melt Adhesive Composition

A hot melt adhesive composition according to one embodiment of the present invention comprises a styrene-based block copolymer, a tackifier, and a plasticizer.

(Styrene-Based Block Copolymer)

The styrene-based block copolymer is a styrene-butadiene block copolymer, and the butadiene portion thereof is partially hydrogenated. As the styrene-butadiene block copolymer having its butadiene portion partially hydrogenated, styrene-butadiene-butylene-styrene block copolymer (SBBS) can be mentioned.

The butadiene portion of the styrene-butadiene block copolymer is preferably hydrogenated by 20 mass % to 90 mass %, more preferably by 30 mass % to 80 mass %.

The weight average molecular weight of the styrene-butadiene block copolymer is not particularly limited. Here, for example, the weight average molecular weight is preferably 30,000 to 500,000, more preferably 60,000 to 300,000. The weight average molecular weight can be obtained by gel permeation chromatograph (GPC) method.

The styrene content of the styrene-butadiene block copolymer is preferably 5 to 50 mass %, more preferably 10 to 40 mass %. When the styrene content is in such range, moderate adhesive strength and holding strength can be realized with respect to the adherend. The styrene content can be measured by the method described in JIS K6383.

Regarding the styrene-based block copolymer, one kind of a styrene-based block copolymer can be used as an adhesive, or two or more kinds of styrene-based block copolymers having different styrene content or weight average molecular weight can be blended and used suitably. That is, by using two or more kinds of the styrene-based block copolymers in combination, the melt viscosity during application of the adhesive can be made low for example, and the viscosity during application can be controlled so that processing is easy. In addition, when two or more kinds of the styrene-based block copolymers are used in combination, it is also preferable in terms of adhesive property, such as the ability to adjust adhesive strength and holding strength of the adhesive.

(Tackifier)

There is no particular limitation regarding the tackifier. Here, the tackifier is preferably a petroleum resin. As the petroleum resin, for example, C9 petroleum resin, hydrogenated C9 petroleum resin, C5 petroleum resin, alicyclic petroleum resin, alicyclic/aromatic petroleum resin, terpene resin, rosin resin, rosin ester resin, terpene-phenol resin, alkyl phenol resin and the like can be mentioned. Among these, petroleum resin is preferably at least one selected from the group consisting of C5 petroleum resin, C5C9 petroleum resin, and hydrogenated C9 petroleum resin. Further, hydrogenated C9 petroleum resin is most preferable. This is since degradation due to exposure to direct sunlight (ultraviolet ray) is small even when the adhesive tape is used outdoors.

The content of the tackifier with respect to 100 parts by mass of the styrene-based block copolymer is preferably 65 to 190 parts by mass, more preferably 80 to 150 parts by mass, and further preferably 100 to 150 parts by mass. When the content is in such range, moderate adhesive strength and holding strength with respect to the adherend can be realized. The content of the tackifier is, particularly for example, 65, 70, 75, 80, 85, 90, 95, 100, 105, 110, 115, 120, 125, 130, 135, 140, 145, 150, 155, 160, 165, 170, 175, 180, 185, or 190, and can be in the range between the two values exemplified herein.

(Plasticizer)

A hot melt adhesive composition according to one embodiment of the present invention comprises a plasticizer. In the hot melt adhesive composition, the content of the plasticizer with respect to 100 parts by mass of the styrene-based block copolymer is 0.1 to 24 parts by mass, preferably 1 to 20 parts by mass, and further preferably 5 to 15 parts by mass.

Here, as the plasticizer, phthalic acid ester-based plasticizer is preferable since it has superior compatibility with the styrene-based block copolymer and thus can achieve plasticizing effect with small amount. As the phthalic acid ester-based plasticizer, DINA (diisononyl adipate), DEHP (di-(2-ethylhexyl)phthalate), DBP (dibutyl phthalate), BBP (butyl benzyl phthalate), DINP (diisononyl phthalate), DIDP (diisodecyl phthalate), and DNOP (di-n-octyl phthalate) can be mentioned. Here, use of phthalic acid esters other than DINA require caution since it can be regulated under regulations such as REACH (Registration, Evaluation, Authorization, and Restriction of Chemicals). However, DINA is not subjected to such regulations, and thus it is preferably used.

(Additive)

A hot melt adhesive composition according to one embodiment of the present invention can contain various additives such as inorganic filler, modifier, stabilizer, antioxidant, UV absorber and the like if necessary, to an extent that it does not interfere with the effect of the present invention.

2. Adhesive Tape

A adhesive tape according to one embodiment of the present invention comprises a porous substrate, and an adhesive layer provided on the porous substrate.

The adhesive tape preferably has an adhesive strength measured in accordance with JIS 20237 "10. adhesive strength" of 1.5 N/cm or more, more preferably 2.0 N/cm or more. The adhesive strength is preferably 8 N/cm or lower, more preferably 6 N/cm or lower. When the adhesive strength is in such range, while the adhesive tape would adhere to the adherend well, it is also easy to unroll the substrate when it is rolled into a tape.

The adhesive tape preferably has a holding strength measured in accordance with JIS 20237 "13. holding strength" of 10 min or more, more preferably 20 min or more. The holding strength is preferably 100 min or less, more preferably 80 min or less. When the holding strength is in such range, while the adhesive tape would have sufficient holding strength, it is also easy to handle the adhesive tape when it is rolled into a tape.

(Porous Substrate)

The porous substrate is not particularly limited so long as it is a substrate made from porous material. Here, nonwoven fabric is preferable in terms of superior mechanical strength such as tensile strength and low cost.

(Adhesive Layer)

The adhesive layer comprises the hot melt adhesive composition. The weight per unit area of the adhesive layer is not particularly limited, and is, for example, 10 to 100 g/m$^2$. When the weight per unit area is too small, the adhesive property would be insufficient, and when the weight per unit area is too large, applying property can degrade.

3. Manufacturing Method of Adhesive Tape

A manufacturing method of adhesive tape according to one embodiment of the present invention comprises a step to apply the hot melt adhesive composition onto a substrate.

There is no particular limitation regarding the application method. Here, it is preferable to melt and knead the raw material of the adhesive with heating, and to apply the adhesive by hot melt method, and is further preferable to apply the adhesive by non-contact application method.

As an example of non-contact application, a cross coater (available from ITW Dynatec K.K) can be mentioned. In general, when an adhesive is directly applied onto a substrate such as a nonwoven fabric, the adhesive seeps into the substrate, and the adhesive property significantly decrease. When the cross coater is used, adhesive can be prevented from seeping into the substrate when the adhesive is applied onto the nonwoven fabric. Therefore, deterioration of the adhesive property hardly occur, which is preferable.

Example

Hereinafter, the present invention will be explained in detail with reference to the Examples. Here, these examples are merely an exemplification, and shall not limit the scope of the invention.

An adhesive composition was applied on the substrate shown in Table 1 and Table 2, so that the weight per unit area would be 60 g/m² using a non-contact application method, thereby forming an adhesive layer to prepare an adhesive tape for evaluation. As the adhesive composition, as shown in Table 1, tackifier and plasticizer (DINA, available from DIC Corporation, MONOCIZER W-242), antioxidant (available from BASF SE, Irganox 1726), UV absorber (available from Johoku Chemical Co., Ltd., JF-77) were added to 100 parts by mass of styrene-based block copolymer, and the mixture was kneaded at 150° C. to obtain a molten adhesive. The adhesive thus obtained was applied using a cross coater to obtain an adhesive layer. Here, the stitch bond nonwoven fabric is a porous substrate, and the PET film is a non-porous substrate.

Each of the components shown in Table 1 and Table 2 are as follows.
SBBS: Asaprene N521, available from Asahi Kasei Corp.
SIS: Quintac 3421, available from Zeon Corporation
C5 petroleum resin: Quintone R100, available from Zeon Corporation
C5C9 petroleum resin: Quintone 5195, available from Zeon Corporation
hydrogenated C9 petroleum resin: Arkon P-100, available from ARAKAWA CHEMICAL INDUSTRIES, LTD.
terpene phenol: YS Polystar T100, available from YASUHARA CHEMICAL CO., LTD.

<Unwinding of Adhesive Tape>

Unwinding of the adhesive tape was evaluated as follows. The substrate coated with the adhesive was rolled onto a 3-inch diameter paper tube, cut into 20 mm width, and then the tape substrate was pulled out by hand from the resulting adhesive tape roll. The following criteria were used for evaluation. The results are shown in Table 1 and Table 2.

A: The tape substrate could be pulled out.

B: Force necessary for pulling out the tape substrate was too large, and the tape substrate could not be pulled out.

<SUS Adhesive Strength>

Peel adhesive strength at 180° with respect to SUS plate was measured in accordance with JIS Z0237 "10. adhesive strength". The results are shown in Table 1 and Table 2.

<Holding Strength>

Holding strength was measured in accordance with JIS Z0237 "13. holding strength". SUS plate was used as the adherend, and the adhering area of the adhesive tape was set to 25 mm×25 mm. The measurement temperature was 60° C., load was 1 kg, and the time required for the weight to drop was measured. The results are shown in Table 1 and Table 2.

TABLE 1

(unit: parts by mass)

| | | | | Example | | | | | | |
|---|---|---|---|---|---|---|---|---|---|---|
| | | | | 1 | 2 | 3 | 4 | 5 | 6 | 7 |
| adhesive composition | styrene-based block copolymer | SBBS | Asaprene N521 | 100 | 100 | 100 | 100 | 100 | 100 | 100 |
| | | SIS | Quintac 3421 | | | | | | | |
| | tackifier | C5 petroleum resin | Quintone R100 | | | | | | 100 | |
| | | C5C9 petroleum resin | Quintone S195 | | | | | | | 100 |
| | | hydrogenated C9 petroleum resin | Arkon P-100 | 100 | 80 | 150 | 100 | 100 | | |
| | plasticizer | DINA | MONOCIZER W-242 | 10 | 10 | 10 | 1 | 20 | 10 | 10 |
| | antioxidant | | Irganox 1726 | 3 | 3 | 3 | 3 | 3 | 3 | 3 |
| | UV absorber | | JF-77 | 1 | 1 | 1 | 1 | 1 | 1 | 1 |
| | substrate | | stitch bond nonwoven fabric | used | used | used | used | used | used | used |
| | | | PET film | | | | | | | |
| weight per unit area of adhesive | | | g/m² | 60 | 60 | 60 | 60 | 60 | 60 | 60 |
| unwinding of adhesive tape | | | — | A | A | A | A | A | A | A |
| SUS adhesive strength | | | N/cm | 2.5 | 1.8 | 2.8 | 2.0 | 2.3 | 2.7 | 2.3 |
| holding strength | | | min (with respect to SUS plate, 60° C.) | 20 | 25 | 11 | 35 | 11 | 18 | 19 |

TABLE 2

(unit: parts by mass)

| | | | | Comparative Example | | | | | | Reference Example |
|---|---|---|---|---|---|---|---|---|---|---|
| | | | | 1 | 2 | 3 | 4 | 5 | 6 | 1 |
| adhesive composition | styrene-based block | SBBS | Asaprene N521 | | 100 | 100 | 100 | | 100 | 100 |
| | | SIS | Quintac 3421 | 100 | | | | 100 | | |
| | tackifier | C5 petroleum resin | Quintone R100 | | | | | | | |
| | | C5C9 petroleum resin | Quintone S195 | 100 | | | | | | 100 |
| | | hydrogenated C9 petroleum resin | Arkon P-100 | | | 100 | 200 | 60 | 100 | 100 |

TABLE 2-continued

| | | Comparative Example | | | | | | (unit: parts by mass) Reference Example |
| --- | --- | --- | --- | --- | --- | --- | --- | --- |
| | | 1 | 2 | 3 | 4 | 5 | 6 | 1 |
| plasticizer DINA | MONOCIZER W-242 | | 30 | 10 | 10 | 10 | | 10 |
| antioxidant | Irganox 1726 | 3 | 3 | 3 | 3 | 3 | 3 | 3 |
| UV absorber | JF-77 | 1 | 1 | 1 | 1 | 1 | 1 | 1 |
| substrate | stitch bond nonwoven fabric | used | used | used | used | used | used | |
| | PET film | | | | | | | used |
| weight per unit area of adhesive | g/m² | 60 | 60 | 60 | 60 | 60 | adhesive was too hard and could not be applied | 60 |
| unwinding of adhesive tape | — | A | A | A | A | A | | B |
| SUS adhesive strength | N/cm | 2.8 | 1.8 | 3.5 | 1.2 | 1.8 | | 8 |
| holding strength | min (with respect to SUS plate, 60° C.) | 2 | 0 | 5 | 28 | 0 | | >1440 |

The invention claimed is:

1. A hot melt adhesive composition, comprising:
   a styrene-based block copolymer;
   a tackifier; and
   a plasticizer; wherein:
   the styrene-based block copolymer is a styrene-butadiene block copolymer and a butadiene portion thereof is hydrogenated by 20 mass % to 90 mass %;
   the tackifier is contained by 65 to 190 parts by mass with respect to 100 parts by mass of the styrene-based block copolymer; and
   the plasticizer is contained by 0.1 to 24 parts by mass with respect to 100 parts by mass of the styrene-based block copolymer.

2. The hot melt adhesive composition of claim 1, wherein the tackifier is a petroleum resin.

3. The hot melt adhesive composition of claim 2, wherein the petroleum resin is at least one selected from the group consisting of C5 petroleum resin, C5C9 petroleum resin, and hydrogenated C9 petroleum resin.

4. The hot melt adhesive composition of claim 1, wherein the plasticizer is DINA (diisononyl adipate).

5. An adhesive tape, comprising:
   a porous substrate; and
   an adhesive layer provided on the porous substrate; wherein:
   the adhesive layer comprises the hot melt adhesive composition of claim 1.

6. A method for manufacturing the adhesive tape of claim 5, comprising the step of:
   an applying step to apply the hot melt adhesive composition on the substrate by a non-contact application method.

* * * * *